(12) United States Patent
Sakui

(10) Patent No.: US 11,345,028 B2
(45) Date of Patent: May 31, 2022

(54) GRASPING ERROR CORRECTION METHOD, GRASPING ERROR CORRECTION APPARATUS, AND GRASPING ERROR CORRECTION PROGRAM

(71) Applicant: TOYOTA JIDOSHA KABUSHIKI KAISHA, Toyota (JP)

(72) Inventor: Takashi Sakui, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 320 days.

(21) Appl. No.: 16/737,482

(22) Filed: Jan. 8, 2020

(65) Prior Publication Data

US 2020/0254611 A1    Aug. 13, 2020

(30) Foreign Application Priority Data

Feb. 7, 2019    (JP) .............................. JP2019-020621

(51) Int. Cl.
*B25J 9/02*    (2006.01)
*B25J 9/16*    (2006.01)
*B25J 18/00*    (2006.01)

(52) U.S. Cl.
CPC .............. *B25J 9/1612* (2013.01); *B25J 9/02* (2013.01); *B25J 18/00* (2013.01)

(58) Field of Classification Search
CPC . B25J 9/1612; B25J 9/02; B25J 18/00; G05B 2219/39476; G05B 2219/39482; G05B 2219/39484; G05B 2219/39536

USPC ........ 700/245, 254, 250, 108, 192; 901/1–2, 901/30, 27
See application file for complete search history.

(56) References Cited

U.S. PATENT DOCUMENTS

| | | | | |
|---|---|---|---|---|
| 6,311,966 B1 * | 11/2001 | Morishita | ......... | H01L 21/67706 269/21 |
| 6,438,437 B1 * | 8/2002 | Yamaoka | ......... | G05B 19/41815 700/112 |
| 6,662,067 B1 * | 12/2003 | Xu | ................... | G05B 19/41825 700/112 |
| 11,001,458 B2 * | 5/2021 | Yamazaki | ................ | B23Q 7/04 |

(Continued)

FOREIGN PATENT DOCUMENTS

| JP | 1-159188 A | 6/1989 |
|---|---|---|
| JP | 8-132368 A | 5/1996 |

(Continued)

*Primary Examiner* — Dalena Tran
(74) *Attorney, Agent, or Firm* — Sughrue Mion, PLLC

(57) ABSTRACT

A grasping error correction method includes a position information acquisition step of acquiring position information of a plurality of areas of a lower component 2, a grasping error value calculation step of calculating a grasping error value based on the position information at the time of the reproduction and the position information of the plurality of areas of the lower component 2 at the time of teaching, and an arm control step of controlling an operation of a multi-axis articulated arm 11*a* so as to correct the grasping error value. Further, in the grasping error value calculation step, the grasping error value is calculated so that a grasping error in a processing nearby area, which is one of the plurality of areas of the lower component 2 that is closest to the processing area, is preferentially eliminated over those in the other areas of the lower component 2.

6 Claims, 7 Drawing Sheets

(56) References Cited

U.S. PATENT DOCUMENTS

| | | |
|---|---|---|
| 2004/0206145 A1 | 10/2004 | Akami et al. |
| 2009/0096148 A1* | 4/2009 | Usui ..................... B25J 9/1692 269/45 |
| 2014/0277734 A1 | 9/2014 | Ichimaru et al. |
| 2020/0206938 A1* | 7/2020 | Mase ..................... B25J 9/0081 |

FOREIGN PATENT DOCUMENTS

| | | |
|---|---|---|
| JP | 2002-82710 A | 3/2002 |
| JP | 2003-326486 A | 11/2003 |
| JP | 2014-176922 A | 9/2014 |

\* cited by examiner

GRASPING ERROR CORRECTION METHOD, GRASPING ERROR CORRECTION APPARATUS, AND GRASPING ERROR CORRECTION PROGRAM

CROSS REFERENCE TO RELATED APPLICATIONS

This application is based upon and claims the benefit of priority from Japanese patent application No. 2019-020621, filed on Feb. 7, 2019, the disclosure of which is incorporated herein in its entirety by reference.

BACKGROUND

The present disclosure relates to a grasping error correction method, a grasping error correction apparatus, and a grasping error correction program.

Patent Literature 1 (Japanese Unexamined Patent Application Publication No. 2014-176922) discloses a technique in which a workpiece held by a right arm and a workpiece held by a left arm are moved close to each other in a state where these workpieces are brought face to face with each other and thereby assembled together. Specifically, according to Patent Literature 1, the position and the posture of at least one of the workpieces are corrected when they are assembled together.

SUMMARY

It should be noted that when a workpiece is grasped by a hand of a robot arm, it is practically impossible to grasp the same place on the workpiece at all times without causing any error. That is, a considerable grasping error may occur. The grasping error includes a grasping position error having three degrees of freedom and a grasping posture error having three degrees of freedom. Further, when a workpiece is processed, it is necessary to correct the above-described grasping error as much as possible. Further, when a workpiece is processed, it is necessary to ensure, in particular, the accuracy of the position of an area of the workpiece to be processed in the processing.

An object of the present disclosure is to provide a technique for improving accuracy of positioning of an area to be processed (hereinafter also referred to as a processing area) of a workpiece in order to eliminate a grasping error.

A first exemplary aspect is a grasping error correction method for correcting a grasping error value of a workpiece grasped by a hand of a multi-axis articulated arm when an operation performed by the multi-axis articulated arm is reproduced, the operation having been memorized through teaching so that the workpiece is grasped by the hand and a processing area of the workpiece is conveyed to a processing place, the grasping error correction method including: a position information acquisition step of acquiring position information of a plurality of areas of the workpiece grasped by the hand at the time of the reproduction; a grasping error value calculation step of calculating the grasping error value based on the position information of the plurality of areas of the workpiece at the time of the reproduction and the position information of the plurality of areas of the workpiece at the time of the teaching; and an arm control step of controlling the operation performed by the multi-axis articulated arm so as to correct the grasping error value, in which in the grasping error value calculation step, the grasping error value is calculated so that a grasping error in a processing nearby area, which is one of the plurality of areas of the workpiece that is closest to the processing area, is preferentially eliminated over those in the other areas of the workpiece. According to the above-described method, it is possible to improve accuracy of positioning of a processing area of a workpiece in order to eliminate a grasping error.

In the grasping error value calculation step, the grasping error value is preferably calculated so that the position information of the processing nearby area at the time of the reproduction coincides with the position information of the processing nearby area at the time of the teaching. According to the above-described method, it is possible to further improve accuracy of positioning of a processing area of a workpiece in order to eliminate a grasping error.

The grasping error value preferably includes a grasping position error value and a grasping posture error value. Further, the grasping error value calculation step preferably includes: a grasping position error value calculation step in which a difference between the position information of the processing nearby area at the time of the reproduction and the position information of the processing nearby area at the time of the teaching is defined as the grasping position error value; and a grasping posture error value calculation step of calculating the grasping posture error value based on position information of at least one processing distant area at the time of the reproduction and the position information of the at least one processing distant area at the time of the teaching, the grasping posture error value being a value when the processing nearby area is used as an origin of a rotation in the posture correction, the at least one processing distant area being at least one of the plurality of areas of the workpiece other than the processing nearby area. According to the above-described method, it is possible to improve accuracy of positioning of a processing area of a workpiece at a higher level in order to eliminate a grasping error.

The workpiece preferably includes a first processing area and a second processing area as the processing area, and the teaching is preferably performed so that the multi-axis articulated arm successively conveys the first and second processing areas of the workpiece to the processing place in this order. In the grasping error value calculation step, when the first processing area is conveyed to the processing place, the grasping error value is preferably calculated so that a grasping error in a first processing nearby area, which is one of the plurality of areas of the workpiece that is closest to the first processing area, is preferentially eliminated over those in the other areas of the workpiece. In the grasping error value calculation step, when the second processing area is conveyed to the processing place, the grasping error value is preferably calculated so that a grasping error in a second processing nearby area, which is one of the plurality of areas of the workpiece that is closest to the second processing area, is preferentially eliminated over those in the other areas of the workpiece. According to the above-described method, it is possible to improve accuracy of positioning of each processing area at a high level.

A program for causing a computer to execute the above-described grasping error correction method is provided.

A second exemplary aspect is a grasping error correction apparatus configured to correct a grasping error value of a workpiece grasped by a hand of a multi-axis articulated arm when an operation performed by the multi-axis articulated arm is reproduced, the operation having been memorized through teaching so that the workpiece is grasped by the hand and a processing area of the workpiece is conveyed to a processing place, the grasping error correction apparatus including: a position information acquisition unit configured to acquire position information of a plurality of areas of the workpiece grasped by the hand at the time of the reproduction; a grasping error value calculation unit configured to calculate the grasping error value based on the position information of the plurality of areas of the workpiece at the time of the reproduction and the position information of the plurality of areas of the workpiece at the time of the teaching; and an arm control unit configured to control an operation performed by the multi-axis articulated arm so as to correct the grasping error value, in which the grasping error value calculation unit calculates the grasping error value so that a grasping error in a processing nearby area, which is one of the plurality of areas of the workpiece that is closest to the processing area, is preferentially eliminated over those in the other areas of the workpiece. According to the above-described method, it is possible to improve accuracy of positioning of a processing area of a workpiece in order to eliminate a grasping error.

According to the present disclosure, it is possible to improve accuracy of positioning of a processing area of a workpiece in order to eliminate a grasping error.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Embodiments according to the present disclosure are described hereinafter with reference to the drawings.

Figure 1:
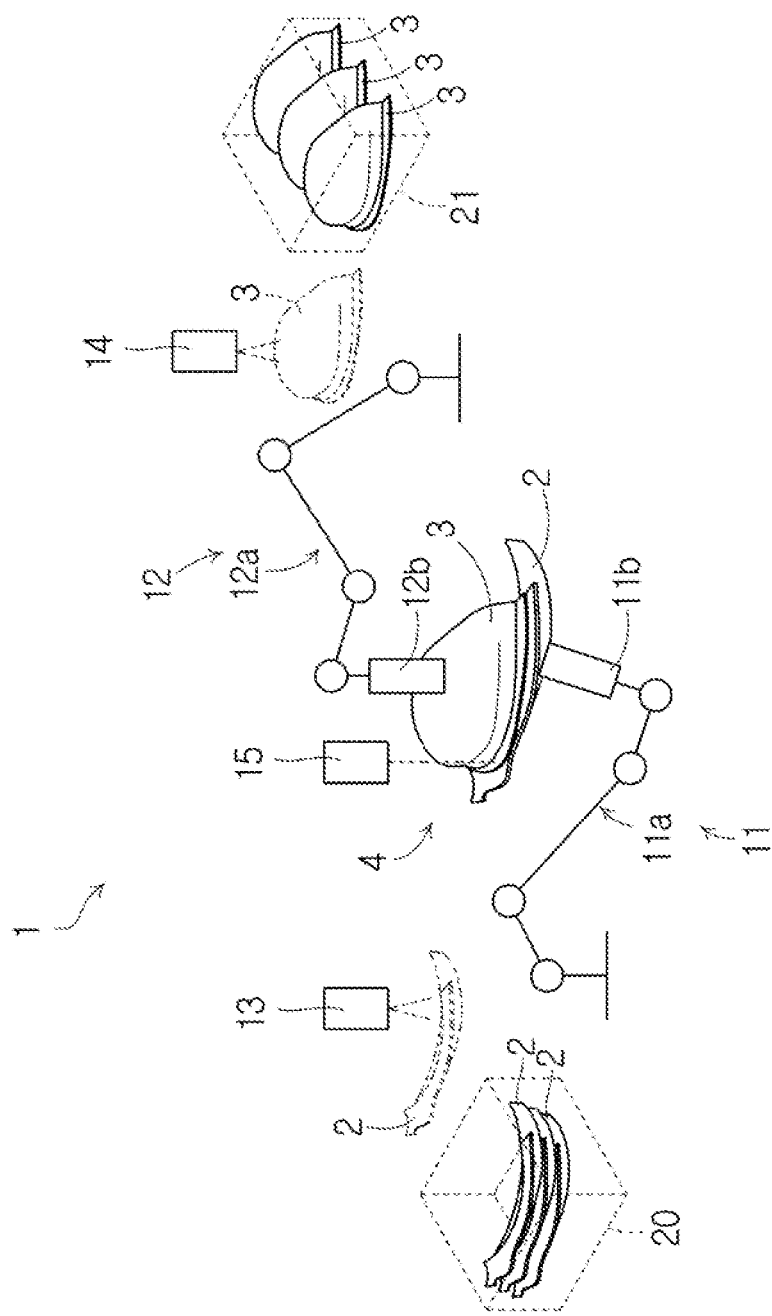
FIG. 1 is a schematic diagram of a joining-process system 1.

FIG. 1 shows a joining-process system 1 according to this embodiment. The joining-process system 1 is a system that manufactures a component assembly 4 by joining a lower component 2 (a workpiece) to an upper component 3 (another workpiece) by laser joining. The joining-process system 1 is a specific example of a component manufacturing system.

In this embodiment, the component assembly 4 constitutes, for example, a part of an oil pan. Each of the lower and upper components 2 and 3 is formed by, for example, pressing a thin steel plate having a thickness of about 1 mm into a desired shape.

Figure 2:
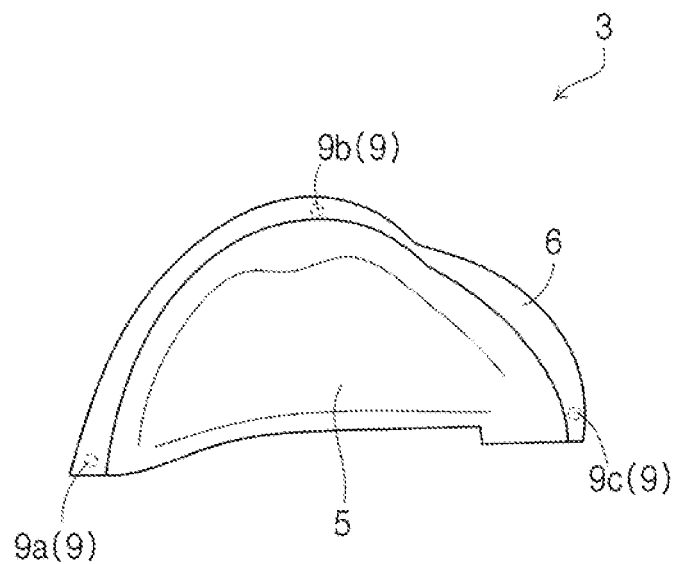
FIG. 2 is a top view of an upper component.

FIG. 2 is a plan view of the upper component 3. As shown in FIG. 2, the upper component 3 includes a bulging part 5 bulging toward the other side (i.e., the back side) of the paper and a flange part 6 extending along an outer peripheral edge of the bulging part 5.

Figure 3:
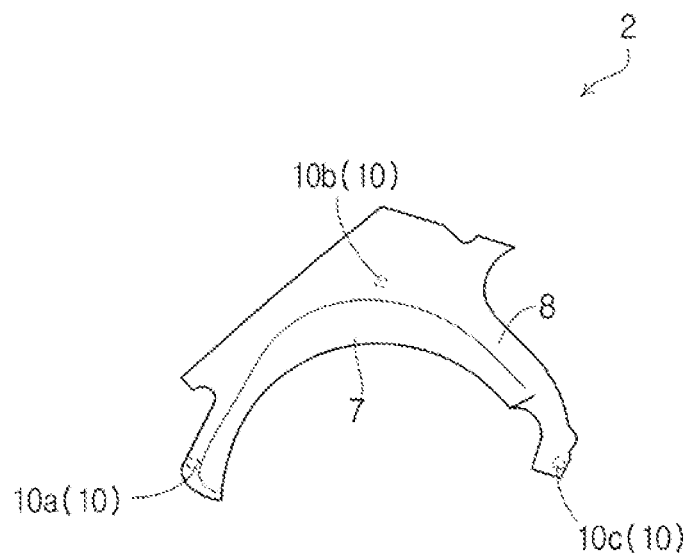
FIG. 3 is a top view of a lower component.

FIG. 3 is a plan view of the lower component 2. As shown in FIG. 3, the lower component 2 includes a bulging part 7 bulging toward this side (i.e., the font side) of the paper and a flange part 8 extending along an outer peripheral edge of the bulging part 7.

Figure 4:
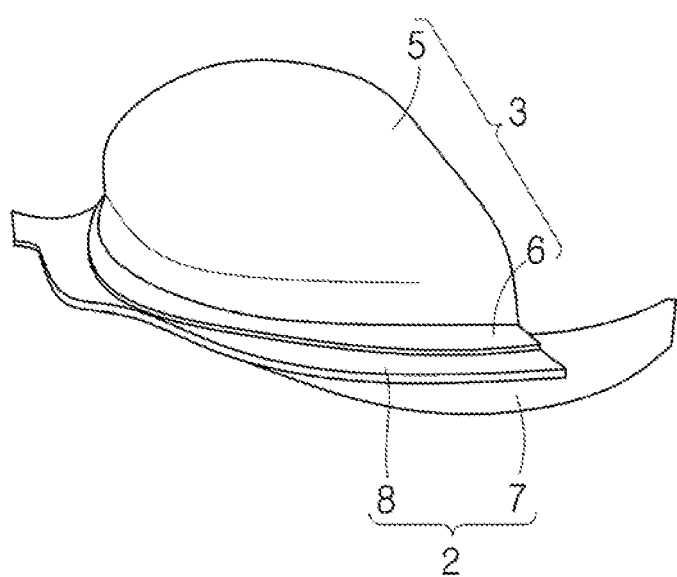
FIG. 4 is a perspective view of a component assembly.

FIG. 4 is a perspective view of the component assembly 4. As shown in FIG. 4, the component assembly 4 is formed by joining the upper and lower components 3 and 2 by laser joining so that the bulging part 5 of the upper component 3 and the bulging part 7 of the lower component 2 bulge (i.e., protrude) in directions in which they face away from each other. The laser joining is performed in the flange part 6 of the upper component 3 and the flange part 8 of the lower component 2.

FIG. 2 shows a plurality of joint areas 9 in each of which laser joining is performed in the flange 6 of the upper component 3. The plurality of joint areas 9 are a specific example of the processing areas. The plurality of joint areas 9 include a first joint area 9a, a second joint area 9b, and a third joint area 9c.

FIG. 3 shows a plurality of joint areas 10 in each of which laser joining is performed in the flange 8 of the lower component 2. The plurality of joint areas 10 are a specific example of the processing areas. The plurality of joint areas 10 include a first joint area 10a, a second joint area 10b, and a third joint area 10c.

Further, the first joint area 9a of the upper component 3 and the first joint area 10a of the lower component 2 are joined to each other by laser joining. Similarly, the second joint area 9b of the upper component 3 and the second joint area 10b of the lower component 2 are joined to each other by laser joining. Further, the third joint area 9c of the upper component 3 and the third joint area 10c of the lower component 2 are joined to each other by laser joining.

As shown in FIG. 1, the joining-process system 1 includes a left industrial robot 11 that conveys the lower component 2 and a right industrial robot 12 that conveys the upper component 3. The left and right industrial robots 11 and 12 are specific examples of robots.

The left industrial robot 11 grasps and takes out a lower component 2 from a parts box 20 containing a plurality of lower components 2 one by one, and conveys it to a place directly below a laser-joining apparatus 15. Similarly, the right industrial robot 12 grasps and takes out an upper component 3 from a parts box 21 containing a plurality of upper components 3 one by one, and conveys it to a place directly below the laser-joining apparatus 15.

The left industrial robot 11 includes a multi-axis articulated arm 11a and a hand 11b attached to a tip of the multi-axis articulated arm 11a as an end effector. Similarly, the right industrial robot 12 includes a multi-axis articulated arm 12a and a hand 12b attached to a tip of the multi-axis articulated arm 12a as an end effector.

Further, the joining-process system 1 includes a left three-dimensional measuring device 13 that measures three-dimensional coordinates of the lower component 2 conveyed by the left industrial robot 11, and a right three-dimensional measuring device 14 that measures three-dimensional coordinates of the upper component 3 conveyed by the right industrial robot 12. The left and right three-dimensional measuring devices 13 and 14 are specific examples of the three-dimensional coordinate measuring device. For example, various range sensors such as those using a phase difference detection method, a TOF method, and a triangular distance measuring method in which patterns are projected can be used.

Further, the joining-process system 1 includes a laser-joining apparatus 15. The laser-joining apparatus 15 is a specific example of the processing apparatus. The laser-joining apparatus 15 is an apparatus that welds workpieces to each other by irradiating them with a laser beam. When the lower and upper components 2 and 3 are joined together by the laser-joining apparatus 15, the lower and upper components 2 and 3 are held by the left and right industrial robots 11 and 12, respectively.

Note that a resistance welding apparatus, a bolt fastening apparatus, a fitting assembling apparatus, or a joining apparatus using an adhesive may be used as the processing apparatus instead of using the laser-joining apparatus 15. Further, each of the lower and upper components 2 and 3 may be formed by injection-molding a resin material into a desired shape or may be made of a composite material in which a metal and a resin are integrally combined, instead of being formed by pressing a thin steel plate into a desired shape. Further, in the joining-process system 1, the lower and upper components 2 and 3 are joined to each other. However, instead of joining two components, three or more components may be joined to each other. In such a case, three or more components are conveyed by three or more industrial robots.

Figure 5:
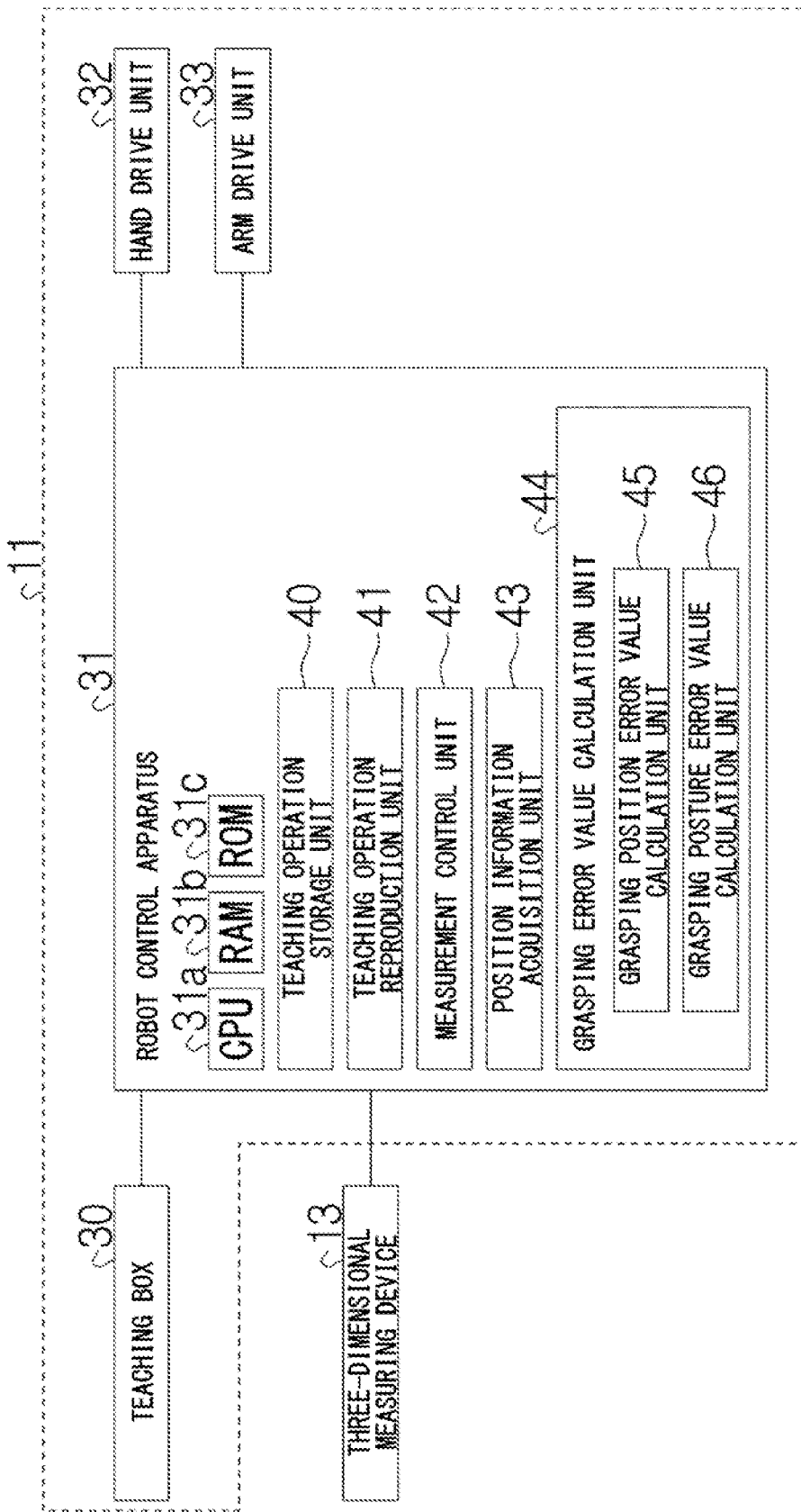
FIG. 5 is a functional block diagram of a left industrial robot.

Next, the left industrial robot 11 is described in detail with reference to FIG. 5. Since the configuration of the right industrial robot 12 is identical to that of the left industrial robot 11, its description is omitted. As shown in FIG. 5, the left industrial robot 11 includes a teaching box 30, a robot control apparatus 31, a hand drive unit 32, and an arm drive unit 33.

The teaching box 30 is an apparatus that enables an operator to input operations performed by the left industrial robot 11 when the operations performed by the left industrial robot 11 are stored (i.e., memorized) in the robot control apparatus 31.

The hand drive unit 32 drives the hand 11*b* based on a control signal provided from the robot control apparatus 31, and is formed by, for example, an electric motor.

The arm drive unit 33 drives the multi-axis articulated arm 11*a* based on a control signal provided from the robot control apparatus 31, and is formed by, for example, an electric motor.

The robot control apparatus 31 includes a CPU (Central Processing Unit) 31*a* that serves as a central processing unit, a readable/writable RAM (Random Access Memory) 31*b*, and a ROM (Read Only Memory) 31*c*. Further, when the CPU 31*a* loads and executes a control program stored in the ROM 31*c*, the control program causes hardware such as the CPU 31*a* to function as a teaching operation storage unit 40, a teaching operation reproduction unit 41, a measurement control unit 42, a position information acquisition unit 43, and a grasping error value calculation unit 44.

The teaching operation storage unit 40 stores (i.e., memorizes) the operations performed by the left industrial robot 11, which are input through the teaching box 30. In the teaching operation storage unit 40, the operations performed by the left industrial robot 11, which are input through the teaching box 30, are stored in the form of, for example, parameters for each driving unit of the left industrial robot 11 in a time-series manner.

The teaching operation reproduction unit 41 (the arm control unit) reproduces the operations performed by the left industrial robot 11, which are stored in the teaching operation storage unit 40, by, for example, outputting control signals to the hand drive unit 32 and the arm drive unit 33.

The measurement control unit 42 controls the left three-dimensional measuring device 13.

The position information acquisition unit 43 acquires three-dimensional coordinate data of the lower component 2 output from the left three-dimensional measuring device 13 and acquires position information of a plurality of areas of the lower component 2 at the time of the teaching and the reproduction based on the acquired three-dimensional coordinate data. Note that the three-dimensional coordinate data of the lower component 2 output from the left three-dimensional measuring device 13 is three-dimensional coordinate data in a coordinate system fixed in a space of a large number of patterns projected onto the lower component 2. Further, the position information of the plurality of areas of the lower component 2 is, for example, position information in a coordinate system fixed to the hand 11*b* of the left industrial robot 11. In this embodiment, the position information of the plurality of areas of the lower component 2 at the time of the teaching and the reproduction is acquired by converting the three-dimensional coordinate data of the plurality of areas of the lower component 2 acquired by changing the position and the posture of the lower component 2 directly below the left three-dimensional measuring device 13 into those in the coordinate system fixed to the hand 11*b* and combining the converted coordinate data with each other.

The grasping error value calculation unit 44 calculates a grasping error value based on the position information of the plurality of areas of the lower component 2 at the time of the reproduction and the position information of the plurality of areas of the lower component 2 at the time of the teaching.

Figure 6:
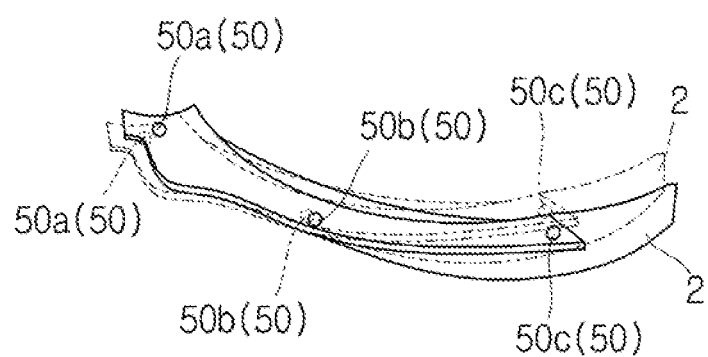
FIG. 6 is a diagram for explaining a current state of a grasping error of the lower component.
Figure 7:
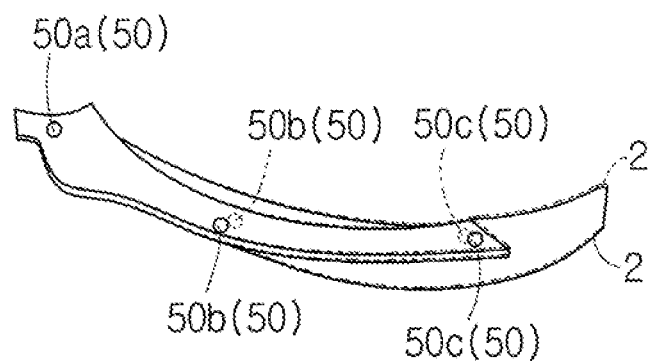
FIG. 7 is a diagram for explaining how to obtain a grasping error of the lower component.

A grasping error is described hereinafter with reference to FIGS. 6 and 7. FIGS. 6 and 7 show the lower component 2 when the hand 11*b* is positioned in a predetermined position and posture with respect to the space. In FIGS. 6 and 7, the lower component 2 indicated by a solid line indicates the lower component 2 at the time of the teaching and the lower component 2 indicated by a double-dashed chain line indicates the lower component 2 at the time of the reproduction.

Here, when the hand 11*b* of the left industrial robot 11 grasps the lower component 2, a grasping error inevitably occurs. The grasping error is an error(s) between a grasping position and a grasping posture at the time when the hand 11*b* grasps the lower component 2 in the process in which the operations performed by the left industrial robot 11 are stored by using the teaching box 30, and those at the time when the hand 11*b* grasps the lower component 2 in the process in which the recorded operations performed by the left industrial robot 11 are reproduced by the teaching operation reproduction unit 41.

That is, in general, when the hand 11*b* of the left industrial robot 11 is made to grasp the lower component 2, the shape of the lower component 2 is recognized by image analysis and the hand 11*b* grasps a predetermined grasping part of the lower component 2. However, it is practically impossible for the hand 11*b* of the left industrial robot 11 to grasp the predetermined grasping part of the lower component 2 without causing any error. That is, every time the hand 11*b* grasps the lower component 2, a non-negligible grasping error may occur. The error in the grasping position is, for example, in the order of several micrometers to several tens of micrometers.

Further, if the lower component 2 is conveyed to a place directly below the laser-joining apparatus 15 while the grasping position contains the above-described grasping error, it is impossible to achieve a high accuracy for the joint between the joint areas 9 and 10.

Therefore, the grasping error value calculation unit 44 calculates a grasping error value based on position information of a plurality of areas of the lower component 2 at the time of the reproduction and position information of the plurality of areas of the lower component 2 at the time of the teaching. The grasping error value includes a grasping position error value and a grasping posture error value. The grasping position error value is an error value that is included in the grasping error value and has three degrees of freedom related to the position. The grasping posture error value is an error value that is included in the grasping error value and has three degrees of freedom related to the posture. Further, the teaching operation reproduction unit 41 controls the operation performed by the multi-axis articulated arm 11a so as to correct the grasping error value calculated by the grasping error value calculation unit 44.

FIG. 6 shows measurement areas 50 which are a plurality of areas of the lower component 2 whose position information has been acquired by the position information acquisition unit 43. Each of the two lower components 2 shown in FIG. 6 is grasped by the hand 11b when the hand 11b is positioned in a predetermined position and a predetermined posture in a space coordinate system. Solid lines indicate the lower component 2 at the time of the teaching and double-dashed chain lines indicate the lower component 2 at the time of the reproduction. The plurality of measurement areas 50 include a measurement area 50a, a measurement area 50b, and a measurement area 50c. Further, a distance between two points of the measurement area 50a, i.e., between the measurement area 50a at the time of the reproduction and that at the time of the teaching is represented by δa. Similarly, a distance between two points of the measurement area 50b, i.e., between the measurement area 50b at the time of the reproduction and that at the time of the teaching is represented by δb. Similarly, a distance between two points of the measurement area 50c, i.e., between the measurement area 50c at the time of the reproduction and that at the time of the teaching is represented by δc.

Note that it is conceivable to calculate a grasping error value so that the distances δa, δb and δc become zero at the same time. However, since the lower component 2 is formed by pressing a thin steel plate into the desired shape, there may be a manufacturing error in the lower component 2. Therefore, there may be no grasping error value with which the distances δa, δb and δc become zero at the same time. Similarly, even if the lower component 2 is processed (i.e., manufactured) by other methods, there is a manufacturing error in the lower component 2. Therefore, there may be no grasping error value with which the distances δa, δb and δc become zero at the same time. Therefore, it is conceivable to, instead of making the distances δa, δb and δc zero at the same time, obtain a grasping error value with which the square sum of δa, δb and δc is minimized. Specifically, it is conceivable to obtain a grasping error value with which (square of δa)+(square of δb)+(square of δc) is minimized.

However, in the case where the above-described calculation method using the least squares method is adopted, when the first joint area 9a is positioned directly below the laser-joining apparatus 15, a small error that has been allowed (i.e., caused) in the least squares method remains. Therefore, it is impossible to accurately join the first joint area 9a of the lower component 2 with the first joint area 10a of the upper component 3.

Therefore, in this embodiment, as shown in FIG. 7, instead of using the above-described method for calculating a grasping error value by using the least squares method, the grasping error value calculation unit 44 calculates a grasping error value so that when, for example, the first joint area 9a is the area to be processed, a grasping error in the measurement area 50a, which is one of the measurement areas 50a, 50b and 50c that is closest to the first joint area 9a, is preferentially eliminated over those in the other measurement areas. More specifically, the grasping error value calculation unit 44 calculates a grasp position error value so that position information of the measurement area 50a when the hand 11b is positioned in a predetermined position and a predetermined posture in a space coordinate system at the time of the reproduction coincides with the position information of the measurement area 50a when the hand 11b is positioned in the predetermined position and the predetermined posture in the space coordinate system at the time of the teaching.

Specifically, as shown in FIG. 5, the grasping error value calculation unit 44 includes a grasping position error value calculation unit 45 and a grasping posture error value calculation unit 46.

The grasping position error value calculation unit 45 calculates a grasping position error value by defining a difference between the position information of the measurement area 50a at the time of the reproduction and the position information of the measurement area 50a at the time of the teaching as the grasping position error value. Further, the grasping posture error value calculation unit 46 calculates a grasping posture error value, which is a value when the measurement area 50a is used as the origin of a rotation in the posture correction, based on a difference between the position information of the measurement areas 50b and 50c at the time of the reproduction and the position information of the measurement areas 50b and 50c at the time of the teaching. Specifically, the grasping posture error value calculation unit 46 may calculate the grasping posture error value so that the sum of the square of a difference between the positional information of the measurement area 50b at the time of the reproduction and that at the time of the teaching and the square of a difference between the positional information of the measurement area 50c at the time of the reproduction and that at the time of the teaching is minimized. Alternatively, the grasping posture error value calculation unit 46 may calculate the grasping posture error value so that the sum of the square of a difference between a reference plane defined by the measurement areas 50a, 50b and 50c at the time of the teaching and the position information of the measurement 50b at the time of the reproduction and the square of a difference between this reference plane and the position information of the measurement 50c at the time of the reproduction is minimized.

By calculating the grasping error value so that a grasping error in the measurement area 50a, which is that is closest to the first joint area 9a, is preferentially eliminated over those in the other measurement area 50b and the like as described above, high accuracy for the positioning of the first joint area 9a is achieved.

Figure 8:
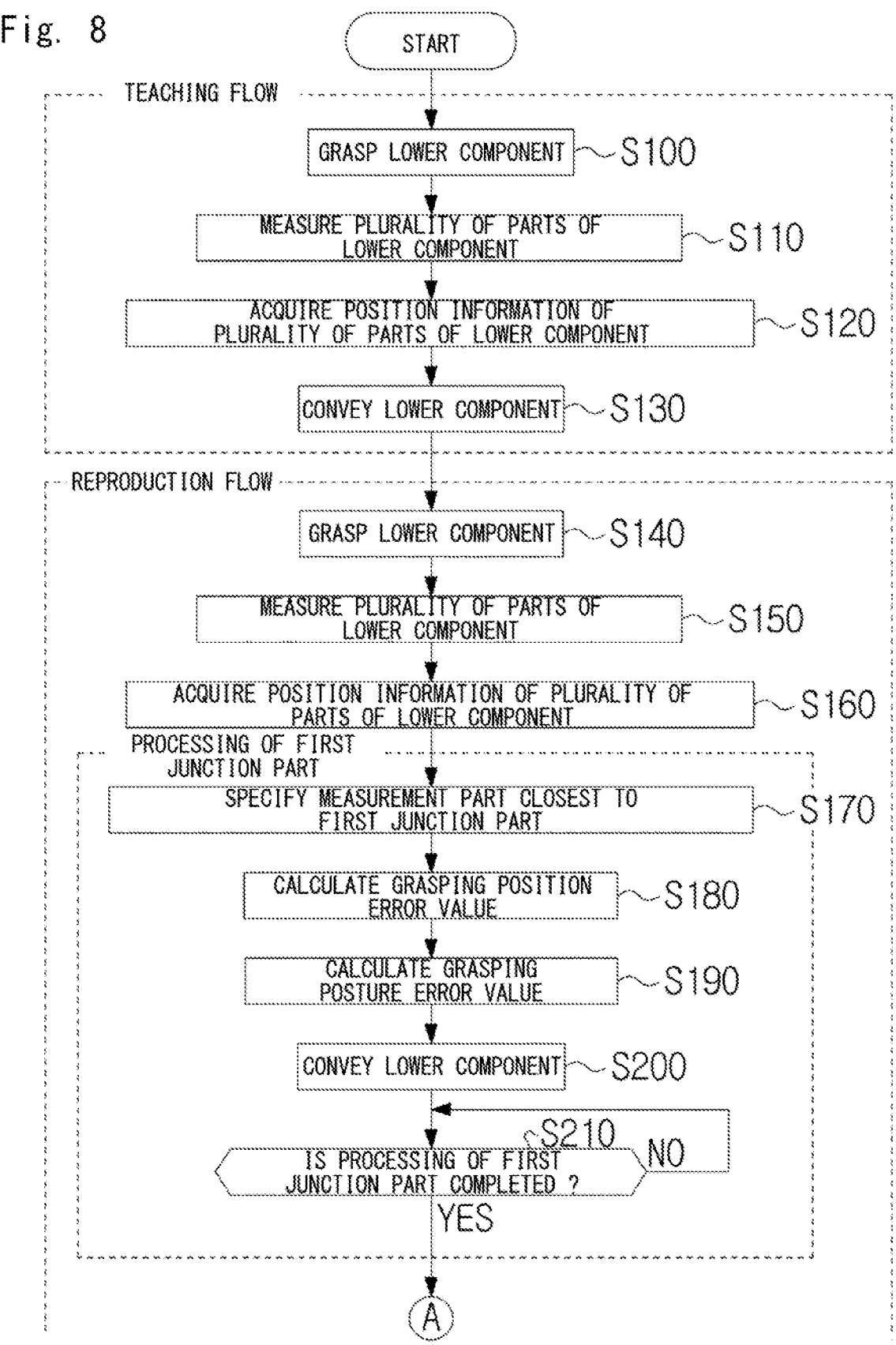
FIG. 8 shows a control flow of the left industrial robot.
Figure 9:
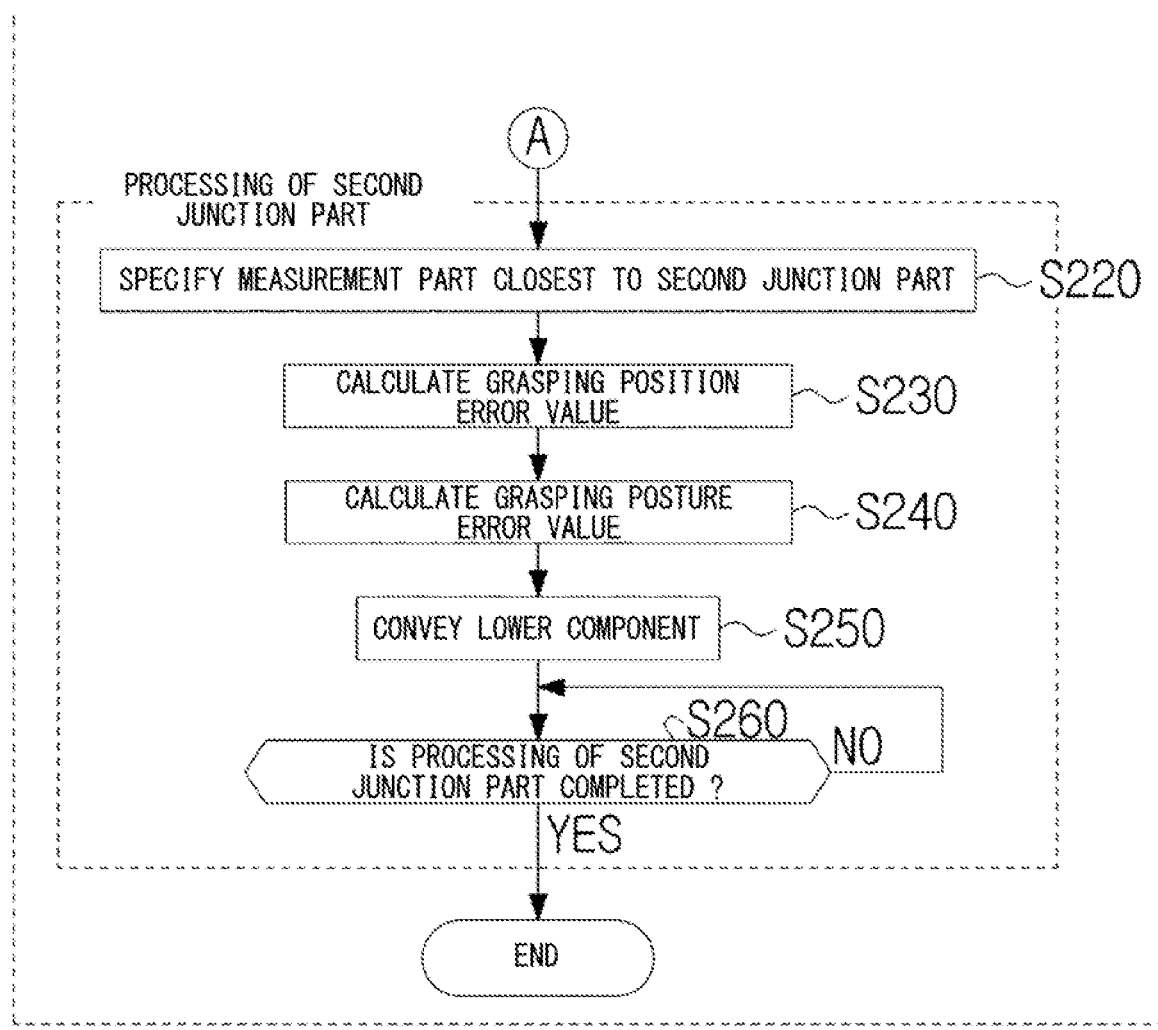
FIG. 9 shows the control flow of the left industrial robot.

Next, operations performed by the robot control apparatus 31 are described with reference to FIGS. 8 and 9. Steps S100 to S130 correspond to a flow at the time of teaching of the robot control apparatus 31. Steps S140 to S260 correspond to a flow at the time of reproduction by the robot control apparatus 31.

(Teaching Flow)

S100:

Firstly, an operator operates the teaching box 30 and thereby makes the hand 11b grasp a lower component 2.

S110:

Next, by operating the teaching box 30, the operator conveys the lower component 2 grasped by the hand 11b to a place directly below the left three-dimensional measuring device 13 and changes the posture of the lower component 2 within a measurement space of the left three-dimensional measuring device 13. By doing so, the operator makes the left three-dimensional measuring device 13 measure a plurality of measurement areas 50 of the lower component 2.

S120:

Next, the position information acquisition unit 43 acquires position information of the plurality of measurement areas 50 of the lower component 2 from the left three-dimensional measuring device 13 and stores the acquired position information in the RAM 31b.

S130:

Next, by operating the teaching box 30, the operator conveys the lower component 2 to a place directly below the laser-joining apparatus 15 and positions the first joint area 9a of the lower component 2 there. Next, the operator positions the second joint area 9b directly below the laser-joining apparatus 15 and then positions the third joint area 9c directly below the laser-joining apparatus 15. The series of operations performed by the left industrial robot 11, which is input through the teaching box 30, is stored in the RAM 31b.

(Reproduction Flow)

S140:

Next, the teaching operation reproduction unit 41 reproduces the series of operations performed by the left industrial robot 11, which is stored in the RAM 31b. Specifically, the teaching operation reproduction unit 41 makes the hand 11b grasp the lower component 2.

S150:

Next, the teaching operation reproduction unit 41 conveys the lower component 2 grasped by the hand 11b to a place directly below the left three-dimensional measuring device 13 and changes the posture of the lower component 2 within the measurement space of the left three-dimensional measuring device 13. By doing so, the teaching operation reproduction unit 41 makes the left three-dimensional measuring device 13 measure the plurality of measurement areas 50 of the lower component 2.

S160:

Next, the position information acquisition unit 43 acquires position information of the plurality of measurement areas 50 of the lower component 2 from the left three-dimensional measuring device 13 and stores the acquired position information in the RAM 31b.

Steps S170 to S210 described below correspond to a flow for laser-welding the first joint area 9a, and steps S220 to S260 correspond to a flow for laser-welding the second joint area 9b.

S170:

The grasping error value calculation unit 44 specifies the measurement area 50a as a measurement area that is closest to the first joint area 9a.

Then, the grasping error value calculation unit 44 calculates a grasping error value so that a grasping error in the measurement area 50a is preferentially eliminated over those in the other parts. Specifically, the calculation is performed as shown in steps S180 and S190.

S180:

The grasping position error value calculation unit 45 calculates a grasping position error value by defining a difference between the position information of the measurement area 50a at the time of the reproduction and the position information of the measurement area 50a at the time of the teaching as the grasping position error value.

S190:

The grasping posture error value calculation unit 46 calculates a grasping posture error value, which is a value when the measurement area 50a is used as the origin of a rotation in the posture correction, based on the difference between the position information of the measurement areas 50b and 50c, which are those among the plurality of measurement areas 50 of the lower component 2 other than the measurement area 50a, at the time of the reproduction, and the position information of the measurement areas 50b and 50c at the time of the teaching.

S200:

Then, the teaching operation reproduction unit 41 controls the operation performed by the multi-axis articulated arm 11a so as to correct the calculated grasping error value, conveys the lower component 2, and positions the first joint area 9a of the lower component 2 directly below the laser-joining apparatus 15.

S210:

The teaching operation reproduction unit 41 determines whether or not the joint in the first joint area 9a is completed. When the teaching operation reproduction unit 41 determines that the joint in the first joint area 9a has not been completed yet (S210: NO), it waits until the joint is completed. When the teaching operation reproduction unit 41 determines that the joint in the first joint area 9a has been completed (S210: YES), it advances the process to the step S220.

S220:

The grasping error value calculation unit 44 specifies the measurement area 50b as a measurement area that is closest to the second joint area 9b.

Then, the grasping error value calculation unit 44 calculates a grasping error value so that a grasping error in the measurement area 50b is preferentially eliminated over those in the other parts. Specifically, the calculation is performed as shown in steps S230 and S240.

S230:

The grasping position error value calculation unit 45 calculates a grasping position error value by defining a difference between the position information of the measurement area 50b at the time of the reproduction and the position information of the measurement area 50b at the time of the teaching as the grasping position error value.

S240:

The grasping posture error value calculation unit 46 calculates a grasping posture error value, which is a value when the measurement area 50b is used as the origin of a rotation in the posture correction, based on the difference between the position information of the measurement areas 50a and 50c, which are those among the plurality of measurement areas 50 of the lower component 2 other than the measurement area 50b, at the time of the reproduction, and the position information of the measurement areas 50a and 50c at the time of the teaching.

S250:

Then, the teaching operation reproduction unit 41 controls the operation performed by the multi-axis articulated arm 11a so as to correct the calculated grasping error value, conveys the lower component 2, and positions the second joint area 9b of the lower component 2 directly below the laser-joining apparatus 15.

S260:

The teaching operation reproduction unit 41 determines whether or not the joint in the second joint area 9b is completed. When the teaching operation reproduction unit 41 determines that the joint in the second joint area 9b has not been completed yet (S260: NO), it waits until the joint is completed. When the teaching operation reproduction unit 41 determines that the joint in the second joint area 9b has been completed (S260: YES), it finishes the process.

Note that the flow for joining the third joint area 9c is the same as the flow for joining the second joint area 9b except that the measurement area and the like of interest are replaced as appropriate. Therefore, its description is omitted.

Preferred embodiments according to the present disclosure have been described so far. These embodiments have the following features.

The grasping error correction method is a method for correcting a grasping error value of a lower component 2 (a workpiece) grasped by a hand 11b of a multi-axis articulated arm 11a when an operation performed by the multi-axis articulated arm 11a is reproduced, the operation having been memorized through teaching so that the lower component 2 is grasped by the hand 11b and a joint area 9 (a processing area) of the lower component 2 is conveyed to a processing place. This method includes the following steps.

S160: A position information acquisition step of acquiring position information of a plurality of areas of the lower component 2 grasped by the hand 11b at the time of the reproduction.

S180 and S190: A grasping error value calculation step of calculating the grasping error value based on the position information of the plurality of areas of the lower component 2 at the time of the reproduction and the position information of the plurality of areas of the lower component 2 at the time of the teaching.

S200: An arm control step of controlling the operation performed by the multi-axis articulated arm 11a so as to correct the grasping error value.

Further, in the grasping error value calculation step (S180 and S190), the grasping error value is calculated so that a grasping error in a processing nearby area, which is one of the plurality of areas of the lower component 2 that is closest to the processing area, is preferentially eliminated over those in the other areas of the lower component 2. According to the above-described method, it is possible to improve accuracy of positioning of the processing area of the lower component 2 in order to eliminate the grasping error.

Further, in the grasping error value calculation step (S180 and S190), the grasping error value is calculated so that the position information of the processing nearby area at the time of the reproduction coincides with the position information of the processing nearby area at the time of the teaching. According to the above-described method, it is possible to further improve the accuracy of positioning of the processing area of the lower component 2 in order to eliminate the grasping error.

Further, the grasping error value includes a grasping position error value and a grasping posture error value. The grasping error value calculation step (S180 and S190) includes the following steps.

S180: A grasping position error value calculation step in which a difference between the position information of the processing nearby area at the time of the reproduction and the position information of the processing nearby area at the time of the teaching is defined as the grasping position error value.

S190: A grasping posture error value calculation step of calculating the grasping posture error value based on position information of at least one processing distant area at the time of the reproduction and the position information of the at least one processing distant area at the time of the teaching, the grasping posture error value being a value when the processing nearby area is used as the origin of a rotation in the posture correction, the at least one processing distant area being at least one of the plurality of areas of the lower component 2 other than the processing nearby area.

According to the above-described method, it is possible to improve accuracy of positioning of the processing area of the workpiece at a higher level in order to eliminate the grasping error.

Further, the lower component 2 includes a first joint area 9a (a first processing area) and a second joint area 9b (a second processing area) as the processing area. The teaching is performed so that the multi-axis articulated arm 11a conveys the first and second joint areas 9a and 9b of the lower component 2 to a place directly below the laser-joining apparatus 15 (i.e., to the processing place) in this order.

Further, in the grasping error value calculation step (S180 and S190), when the first joint area 9a is conveyed to the place directly below the laser-joining apparatus 15 (S200), the grasping error value is calculated so that a grasping error in the measurement area 50a (a first processing nearby area), which is one of the plurality of measurement areas 50 of the lower component 2 that is closest to the first joint area 9a, is preferentially eliminated over those in the other measurement areas 50 of the lower component 2. In contrast, in the grasping error value calculation step (S180 and S190), when the second joint area 9b is conveyed to the place directly below the laser-joining apparatus 15 (S250), the grasping error value is calculated so that a grasping error in the measurement area 50b (a second processing nearby area), which is one of the plurality of measurement areas 50 of the lower component 2 that is closest to the second joint area 9b, is preferentially eliminated over those in the other measurement areas 50 of the lower component 2. According to the above-described method, it is possible to improve accuracy of positioning of each processing area at a high level.

Further, the robot control apparatus 31 (a grasping error correction apparatus) is an apparatus configured to correct a grasping error value of a lower component 2 grasped by a hand 11b of a multi-axis articulated arm 11a when an operation performed by the multi-axis articulated arm 11a is reproduced, the operation having been memorized through teaching so that the lower component 2 is grasped by the hand 11b and a joint area 9 of the lower component 2 is conveyed to a place directly below the laser-joining apparatus 15. The robot control apparatus 31 includes a position information acquisition unit 43, a grasping error value calculation unit 44, and a teaching operation reproduction unit 41.

The position information acquisition unit 43 acquires position information of a plurality of measurement areas 50 of the lower component 2 grasped by the hand 11b at the time of the reproduction. The grasping error value calculation unit 44 calculates the grasping error value based on the position information of the plurality of measurement areas 50 of the lower component 2 at the time of the reproduction and the position information of the plurality of measurement areas 50 of the lower component 2 at the time of the teaching. The teaching operation reproduction unit 41 (an arm control unit) controls the operation performed by the multi-axis articulated arm 11a so as to correct the grasping error value.

Further, the grasping error value calculation unit 44 calculates the grasping error value so that a grasping error in the measuring part 50a, which is one of the plurality of measurement areas 50 of the lower component 2 that is closest to the first joint area 9a, is preferentially eliminated over those in the other measurement areas 50 of the lower component 2. According to the above-described method, it is possible to improve accuracy of positioning of the first joint area 9a of the lower component 2 in order to eliminate the grasping error.

In the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A grasping error correction method for correcting a grasping error value of a workpiece grasped by a hand of a multi-axis articulated arm when an operation performed by the multi-axis articulated arm is reproduced, the operation having been memorized through teaching so that the workpiece is grasped by the hand and a processing area of the workpiece is conveyed to a processing place, the grasping error correction method comprising:
    acquiring position information of a plurality of areas of the workpiece grasped by the hand at the time of the reproduction;
    calculating the grasping error value based on the position information of the plurality of areas of the workpiece at the time of the reproduction and the position information of the plurality of areas of the workpiece at the time of the teaching; and
    controlling the operation performed by the multi-axis articulated arm so as to correct the grasping error value, wherein
    in the calculating, the grasping error value is calculated so that a grasping error in a processing nearby area, which is one of the plurality of areas of the workpiece that is closest to the processing area, is preferentially eliminated over those in the other areas of the workpiece.

2. The grasping error correction method according to claim 1, wherein in the calculating, the grasping error value is calculated so that the position information of the processing nearby area at the time of the reproduction coincides with the position information of the processing nearby area at the time of the teaching.

3. The grasping error correction method according to claim 1, wherein
    the grasping error value includes a grasping position error value and a grasping posture error value, and
    the calculating comprises:
        defining a difference between the position information of the processing nearby area at the time of the reproduction and the position information of the processing nearby area at the time of the teaching as the grasping position error value; and
        calculating the grasping posture error value based on position information of at least one processing distant area at the time of the reproduction and the position information of the at least one processing distant area at the time of the teaching, the grasping posture error value being a value when the processing nearby area is used as an origin of a rotation in the posture correction, the at least one processing distant area being at least one of the plurality of areas of the workpiece other than the processing nearby area.

4. The grasping error correction method according to claim 1, wherein
    the workpiece comprises a first processing area and a second processing area as the processing area,
    the teaching is performed so that the multi-axis articulated arm successively conveys the first and second processing areas of the workpiece to the processing place in this order,
    in the calculating, when the first processing area is conveyed to the processing place, the grasping error value is calculated so that a grasping error in a first processing nearby area, which is one of the plurality of areas of the workpiece that is closest to the first processing area, is preferentially eliminated over those in the other areas of the workpiece, and
    in the calculating, when the second processing area is conveyed to the processing place, the grasping error value is calculated so that a grasping error in a second processing nearby area, which is one of the plurality of areas of the workpiece that is closest to the second processing area, is preferentially eliminated over those in the other areas of the workpiece.

5. A non-transitory computer readable medium storing a program for causing a computer to execute the grasping error correction method according to claim 1.

6. A grasping error correction apparatus configured to correct a grasping error value of a workpiece grasped by a hand of a multi-axis articulated arm when an operation performed by the multi-axis articulated arm is reproduced, the operation having been memorized through teaching so that the workpiece is grasped by the hand and a processing area of the workpiece is conveyed to a processing place, the grasping error correction apparatus comprising:
    a position information acquisition unit configured to acquire position information of a plurality of areas of the workpiece grasped by the hand at the time of the reproduction;
    a grasping error value calculation unit configured to calculate the grasping error value based on the position information of the plurality of areas of the workpiece at the time of the reproduction and the position information of the plurality of areas of the workpiece at the time of the teaching; and
    an arm control unit configured to control an operation performed by the multi-axis articulated arm so as to correct the grasping error value, wherein the grasping error value calculation unit calculates the grasping error value so that a grasping error in a processing nearby area, which is one of the plurality of areas of the workpiece that is closest to the processing area, is preferentially eliminated over those in the other areas of the workpiece.

\* \* \* \* \*